Oct. 16, 1951  R. P. HEBERT  2,571,713
GAS TIMING AND METERING VALVE
Filed Dec. 16, 1949  2 SHEETS—SHEET 1
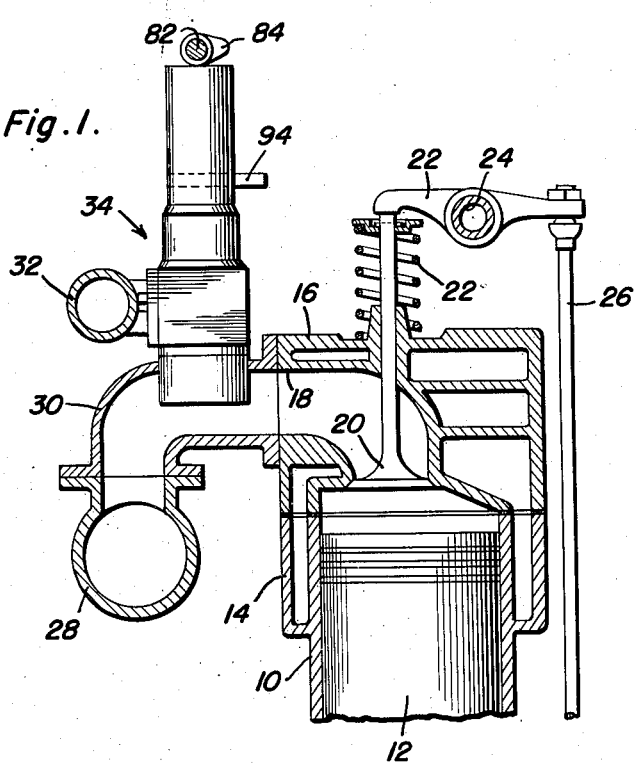
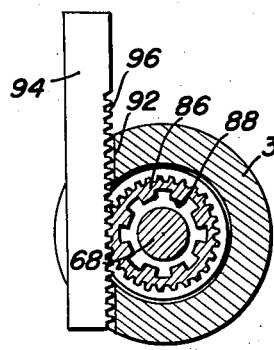
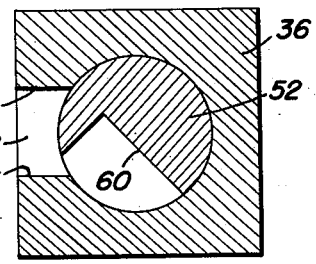
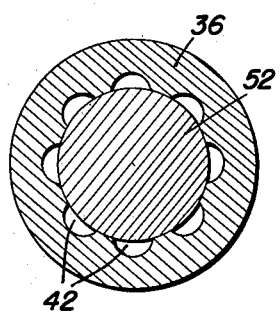
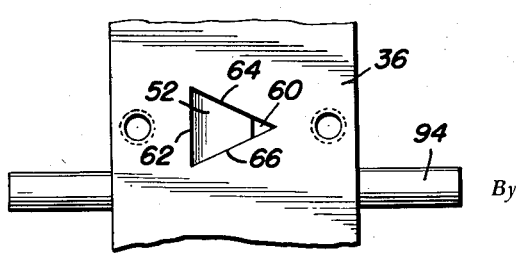
Inventor
Roy P. Hebert
By *Clarence A. O'Brien and Harvey B. Jacobson*
Attorneys Oct. 16, 1951.  R. P. HEBERT  2,571,713
GAS TIMING AND METERING VALVE
Filed Dec. 16, 1949  2 SHEETS—SHEET 2

Inventor
Roy P. Hebert

By Clarence A. O'Brien
and Harvey B. Jacobson
Attorneys

UNITED STATES PATENT OFFICE 2,571,713

GAS TIMING AND METERING VALVE

Roy P. Hebert, Lafayette, La., assignor of fifteen per cent to Jerome E. Domengeaux, Lafayette, La.

Application December 16, 1949, Serial No. 133,276

3 Claims. (Cl. 123—120)

This invention comprises novel and useful improvements in a gas timing and metering valve and more specifically pertains to a control valve for introducing controlled and timed admissions of natural gas into the air intake manifold of internal combustion engines, such as diesel engines and the like.

The principal object of this invention is to improve the operation of internal combustion engines, such as diesel engines and the like, by converting the same or adapting the same to the use of natural gas as a fuel.

A further important object of the invention is to provide a control means for introducing timed and measured charges of natural gas into the air intake manifold of internal combustion engines for adapting the same to run upon natural gas as a fuel.

A further object of the invention is to provide a timing metering valve for introducing natural gas into the air intake manifolds of internal combustion engines in an improved manner and wherein the timing and metering of the fuel to each individual cylinder of the engine may be readily and independently adjusted and yet wherein the timing and control of the entire fuel supply for all of the cylinders of the engine may be readily simultaneously controlled from the engine governor or the like.

These, together with various ancillary features and objects of the invention which will later become apparent as the following description proceeds, are attained by the present invention, a preferred embodiment of which has been illustrated by way of example only in the accompanying drawings, wherein:

Figure 1 is a fragmentary vertical sectional view through a portion of internal combustion engine cylinder and air intake manifold therefor showing the installation of a gas timing and metering valve thereto in accordance with the principles of this invention, the metering valve being greatly exaggerated in size;

Figure 4 is a horizontal sectional view taken substantially upon the plane of the section line 4—4 of Figure 2 and illustrating the manner in which the metering action of the valve may be adjusted and controlled;

Figure 5 is a horizontal sectional view taken substantially upon the plane indicated by the section line 5—5 of Figure 2 and illustrating the arrangement of the control port of the valve;

Figure 6 is a horizontal sectional view taken substantially upon the plane of the section line 6—6 of Figure 2 illustrating the construction of the discharge nozzle portion of the valve;

Figure 7 is a vertical elevational view taken substantially upon the plane indicated by the section line 7—7 of Figure 2 and showing the inlet port of the valve.

Figure 2:
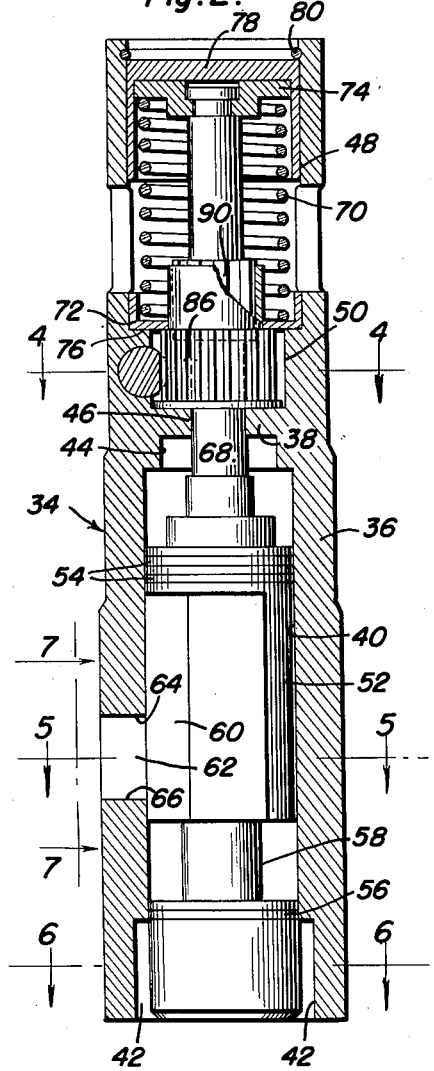
Figure 2 is a vertical central longitudinal sectional view through the gas timing and metering valve forming the subject of this invention, upon an enlarged scale.

Referring now more specifically to the accompanying drawings, wherein like numerals designate similar parts throughout the various views, attention is directed first to Figure 1 wherein for simplicity of illustrating the principles of operation of this invention there is disclosed a portion of an internal combustion engine cylinder 10 having the customary piston 12 reciprocatingly mounted therein, the cylinder being provided with a water jacket 14, with a removable cylinder head 16, together with an intake passage 18 controlled by a poppet valve or the like 20, the valve extending above the cylinder head and provided with the customary valve closing spring 22, with a valve operating rocker 23 journaled upon a fulcrum as at 24, and having a valve actuating push rod 26 operating in any suitable manner from the cam shaft of the engine, not shown.

It will be here understood that the invention is applicable to multiple cylinder internal combustion engines of all types, and preferably of the diesel cycle of operation; but in any event is intended to adapt such engines for the burning of natural gas as a fuel.

Diesel and similar engines are customarily provided with an air intake pressure supply line 28 which is connected by suitable risers 30 of an intake manifold with the intake passages 18. In the customary diesel engine, measured charges of fuel, usually liquid fuel, are injected directly into the air within the cylinder 10 as compressed by the piston 12 to provide the combustible mixture of the engine. The present invention employs natural gas as a supplement or a substitute for the customary liquid fuel heretofore employed, and this natural gas may be supplied under any suitable pressure from a gas header or conduit 32 by means of a gas timing and metering valve indicated generally by the numeral 34 directly into the manifold riser 30 for each of the engine cylinders. Usually the valve 34 will supply about 90% of the required fuel, the remaining 10% of the usual liquid fuel being injected by the conventional liquid fuel injector mechanism, not shown, and which serves as the ignition agent for the gaseous fuel.

It is intended to very accurately control the timing and quantity of the charge of natural gas admitted into the air intake of the engine for precisely regulating the power of the same, both as regards the power of the entire engine and as regards the power of the individual cylinders with respect to each other. For this purpose, the gas timing and metering valve 34 which forms the improvement constituting the subject matter of this invention, may conveniently embody the construction illustrated in Figure 2 of the drawings. The valve assembly 34 has been illustrated in greatly exaggerated size. Usually, the top of the valve assembly will be about equal in height to that of the intake valve stem.

This valve assembly comprises a casing or body 36 which is conveniently divided as by a transverse partition 38 into upper and lower chambers. The lower chamber includes a bore 40 which opens through the lower end of the body, terminating in a diametrically reduced portion 44. The partition is axially apertured as at 46 to establish communication between the upper and lower chambers.

The upper chamber in its turn comprises a bore 48 opening to the upper extremity of the body 36, this bore terminating at its lower end and above the partition 38 in a diametrically reduced chamber 50.

Slidably received in the bore 40 of the lower chamber, is a valve body 52, which, as shown in Figure 5, is of the same cross sectional configuration as the bore 40, being preferably of circular shape. At its upper end, the valve body 52 may be provided with the customary fluid-tight pressure and sealing rings 54 which slidingly engage the inner surface of the bore 40 to establish a gas-tight seal therewith, similar packing rings 56 being carried by the lower end of the valve body as shown in Figure 2.

Intermediate its ends, the valve body is provided with a diametrically reduced portion 58 for a purpose which will be later apparent, and a V-shaped notch is formed longitudinally in the circumference of the body 52, communicating with the annularly reduced groove or portion 58 at its lower end, and terminating adjacent the upper end of the body. This longitudinal passage or groove is indicated by the numeral 60 and is shown more clearly in Figure 5.

At any convenient place, the wall of the body 36 has a triangular-shaped aperture in the side thereof, this aperture, as shown in Figure 7, having a vertically extending edge 62 from the upper and lower ends of which extend converging edges 64 and 66 to thus define a triangular-shaped opening constituting the inlet port of the metering valve.

At its upper end, the valve body 52 has an axially and upwardly extending shaft 68 which slidably and guidingly is extended through the aperture 46 of the partition 38, into the bore 48 of the upper chamber, this valve stem being surrounded by a valve closing, compression spring 70 which is seated upon a cup-shaped washer 72 at its lower extremity and engages a valve retaining seat 74 at its upper end. The valve washer 72 is seated upon a shouldered portion 76 which is formed by the intersection of the bores 48 and 50. The valve retaining seat or washer 74 is secured in any desired manner and in a detachable way to the upper extremity of the valve stem 68 and serves to compress and retain the valve closing spring thereon. Thus, the expansive force of the closing spring serves to urge the entire valve stem and valve assembly upwardly with respect to the body portion 36, to retain the valve in a valve closing position as set forth hereinafter. Slidably received in the open upper end of the bore 48, is an inverted cup member 78 which is slidably received within the bore and guided therein, and which abuts the upper surface of the valve washer 74. The cup 78, while slidable freely within the bore 48, is prevented from removal therefrom as by means of a suitable type of fastener such as a split ring washer or the like 80.

As indicated in Figure 1, it is intended that a cam shaft or other suitable actuating means may be provided for imparting, as by means of a shaft 82, and a plurality of cams 84, one being disposed for each of the timing and metering valves 34, a downward movement to the valve stem and valve assembly against the closing bias of the spring 70.

It will now be understood that the operation of the cams 84 will be in timed relation to the operation of the engine crankshaft and cam shaft of the inlet valve 20, the valve actuating mechanisms for controlling these elements being in themselves well known and forming no part of the present invention. Alternately, since as pointed out hereinbefore the top of the valve 34 is substantially level with the end of the stem of the valve 20, an extension of the rocker arm 23 could simultaneously operate the valve 34.

Received within the bore 50 is a gear 86 which is provided with internal splines or keys 88 by means of which the same is non-rotatably but is slidably secured to an externally splined or keyed enlargement 90, formed upon or rigidly attached to the valve stem 68. The gear 86 is retained in a downwardly seated position upon the partition 38 by means of the yielding, biasing action of the spring cup 72 which engages the shoulder 76 and the upper surface of the gear 86. It will thus be seen that the gear is maintained against sliding movement, while the valve stem is freely slidable therethrough.

As shown best in Figure 4, in conjunction with Figures 1 and 2, the valve body 36 is provided with a chordal slot 92 intersecting the bore 50, and a rack bar 94 having rack teeth in constant mesh with the gear 86, so that upon lateral sliding movement of the rack bar, under the control of any suitable actuating means such as the engine governor or the like, the gear 86 and consequently the valve stem will be rotated, without in any way interfering with the axial reciprocation of the valve member.

From the foregoing, it is thought that the operation of the timing and metering valve will now be understood, this operation being as follows. The natural gas supply line 32 is provided with a suitable conduit connection with each of the triangular-shaped inlet ports of each of the metering valves 34. These triangular-shaped metering ports register at all times with the longitudinally extending V-shaped grooves or slots 60 on the valve body, during reciprocation of the valves. It will be seen, however, that as the valve is rotated by the rack and pinion engagement, by particular reference to Figures 5 and 7, that the cross-sectional area of the triangular port which is placed in register with the grooves 60 will likewise be varied during the rotation of the valve, and by virtue of the converging sloping edges 64 and 66, the rate of flow from the natural gas source under constant pressure to the interior valve will thus be varied and consequently the quantity of natural gas which is admitted into the valve will be metered or controlled.

When the valve is in its upper position as shown in Figure 2, the valves 34 and 20 simultaneously begin their stroke. A charge of gas will be received in the valve passage 60, and in the annular groove 58 which is in communication therewith at all times. However, this charge of gas cannot flow into the discharge passages 42 of the nozzle portion of the valve until the cam 84 and the cup 78 have depressed the valve against the action of the spring 70 about one-quarter of an inch to cause the lower surface of the grooved portion 58 to uncover the upper ends of the grooves 42. When the gas valve opens, the air valve 20 has already begun a flow of air into the cylinder. At this time, however, the gas is free to flow under pressure from the header 32, through the triangular port, passage 60 and groove 58, through the passage 42 and from the lower end of the valve body into the manifold riser 30, in which the valve body is mounted in any suitable manner and at any suitable place. This charge of natural gas is entrained in the moving stream of incoming air from the air supply header 28, and immediately introduced through the inlet valve 20 into the cylinder 10. The gas likewise ceases its flow before the air is cut off, preventing any accumulation of gas in the manifold.

Since it is contemplated that the valve shall be reciprocated in properly timed relation to the movement of the engine piston 12 and the inlet valve 20, and at a speed which is proportional to the speed of rotation of the engine, it will be seen that throttling or metering of the charge by rotating the valve and thus varying the area of the registering ports can be accurately and readily effected. At the same time, since the control rack bars 94 of a plurality of cylinders are customarily tied to a common governor or other actuating means, the metering valves of the plurality of cylinders may be simultaneously controlled; while individual cylinders may be readily regulated or adjusted relative to each other by merely changing the relation of any rack 94 with its corresponding gear 86.

Figure 3:
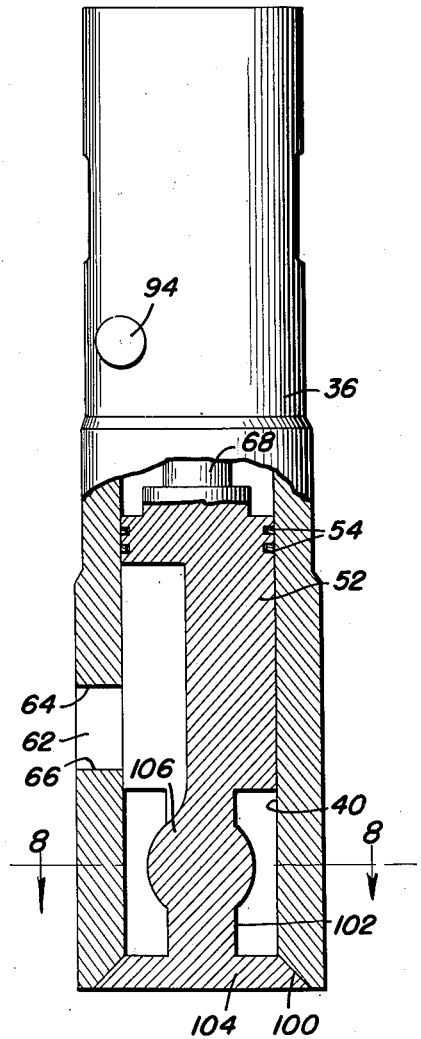
Figure 3 is a view similar to Figure 2, parts being shown in elevation, of a slightly modified form of timing and metering valve.
Figure 8:
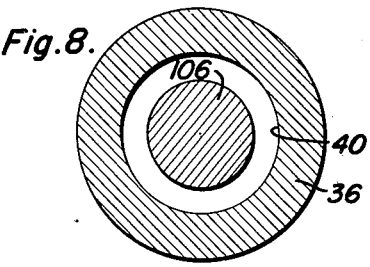
Figure 8 is a horizontal sectional view taken substantially upon the plane of the section line 8—8 of Figure 3 and showing certain details of the construction of the modified form of valve disclosed herein.

Reference is now made to Figures 3 and 8 for a slightly modified valve construction. The same valve casing 36 is employed as in the preceding embodiment, except that the bore 40 forming the lower chamber of the same is preferably of uniform diameter throughout its entire length, and a valve seat 100 is provided upon the lower surface of the body 36 communicating with the end of the bore 40. The same triangular-shaped inlet port is provided having the edges 62, 64 and 66, as previously described. Similarly, the same construction of valve body 52, with upper packing rings 54 and a valve stem 68 is provided, the same actuating and adjusting mechanism being employed as that previously described. However, the lower end of the valve body is of a slightly modified construction in a manner to be now set forth. The valve at its lower extremity terminates in a diametrically reduced axial extension 102 having a conventional form of poppet valve on the lower end thereof as at 104, this poppet valve being adapted to seat upon the valve seat 100 when the valve is in its raised position. Intermediate its ends, the axial extension 102 is provided with a spherical enlargement 106 which serves to restrict the cross-sectional area of the passage between the stem 102 and the bore 40, so that when the valve is in its lowered or open position, the gas entering the same will be caused to flow around the restriction afforded by the enlargement 106, which thus operates as a Venturi action.

By this construction, the opening of the poppet valve may be varied on the cylinders of multiple cylinder internal combustion engines without affecting the flow of gas, because the area of the opening around the poppet valve will be greater than the area around the enlargement on the poppet valve stem.

Except for the modified lower construction of the valve member, this embodiment functions in the same manner as that previously described.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A gas timing and metering valve for internal combustion engines comprising a body having a bore therein, an inlet port in said body communicating with said bore, a valve slidable and rotatable in said bore, a longitudinal groove on the surface of said valve continuously in registry with said port during the entire rotary and sliding movement of said valve, discharge passages in said body communicating with said bore, a delivery groove in said valve, continuously communicating with said longitudinal groove and registrable with said discharge passages during a predetermined portion of the sliding movement of said valve, spring means urging said valve to a closing position interrupting communication of said delivery groove and said discharge passages, means for causing timing reciprocation of said valve.

2. A gas timing and metering valve for internal combustion engines comprising a body having a bore therein, an inlet port in said body communicating with said bore, a valve slidable and rotatable in said bore, a longitudinal groove by the surface of said valve continuously in registry with said port during the entire rotary and sliding movement of said valve, discharge passages in said body communicating with said bore, a delivery groove in said valve, continuously communicating with said longitudinal groove and registrable with said discharge passages during a predetermined portion of the sliding movement of said valve, spring means urging said valve to a closing position interrupting communication of said delivery groove and said discharge passages, means for causing timing reciprocation of said valve, means for rotating said valve whereby to vary the cross sectional area of registry of said longitudinal groove and said port.

3. A gas timing and metering valve for internal combustion engines comprising a body having a bore therein, an inlet port in said body communicating with said bore, a valve slidable and rotatable in said bore, a longitudinal groove on the surface of said valve continuously in registry with said port during the entire rotary and sliding movement of said valve, discharge passages in said body communicating with said bore, a delivery groove in said valve, continuously communicating with said longitudinal groove and registrable with said discharge passages during a predetermined portion of the sliding movement of said valve, spring means urging said valve to a closing position interrupting communication of said delivery grove and said discharge passages, means for causing timing reciprocation of said valve, means for rotating said valve whereby to vary the cross sectional area of registry of said longitudinal groove and said port, said last means comprising a gear slidingly but non-rotatably secured to said valve, said spring means yieldingly maintaining said gear in an axially fixed position with respect to said body and means for rotating said gear.

ROY P. HEBERT.

REFERENCES CITED

The following references are of record in the file of this patent:

UNITED STATES PATENTS

| Number | Name | Date |
|---|---|---|
| 679,053 | Johnston | July 23, 1901 |
| 999,426 | Asalakson | Aug. 1, 1911 |
| 1,833,265 | Schmidt | Nov. 24, 1931 |